United States Patent [19]

Sawai et al.

[11] Patent Number: 5,802,471
[45] Date of Patent: Sep. 1, 1998

[54] MOBILE COMMUNICATION SYSTEM, AUTOMATIC CALL RECEIVING METHOD, AND MOBILE STATION

[75] Inventors: Koichi Sawai, Yokohama; Kunio Yoshikawa, Tokyo; Yukiya Miyasita, Yokohama, all of Japan

[73] Assignee: NTT Mobile Communications Network, Inc., Japan

[21] Appl. No.: 578,457

[22] Filed: Dec. 26, 1995

[30] Foreign Application Priority Data

Dec. 28, 1994 [JP] Japan .................. 6-327677

[51] Int. Cl.⁶ ...................... H04Q 7/14; H04Q 7/00
[52] U.S. Cl. ............. 455/445; 455/31.2; 455/415; 455/417; 455/414; 455/403; 455/557; 379/93.09; 379/93.34; 379/93.11; 379/93.08; 379/210; 375/222
[58] Field of Search ............. 455/445, 417, 455/557, 453, 415, 414, 31.2, 422, 560, 554, 555, 74.1; 379/210, 93.06, 231, 258, 268, 92.01, 93.28, 93.09, 93.31, 93.32, 93.08, 93.11, 93.33, 93.34, 100.15, 100.17; 375/219, 222, 220, 377

[56] References Cited

U.S. PATENT DOCUMENTS

| | | | |
|---|---|---|---|
| 5,062,133 | 10/1991 | Melrose | 379/93.11 |
| 5,202,899 | 4/1993 | Walsh | 375/222 |
| 5,361,296 | 11/1994 | Reyes et al. | 379/93.29 |
| 5,467,390 | 11/1995 | Brankley et al. | 379/210 |
| 5,471,522 | 11/1995 | Sells et al. | 379/93.11 |
| 5,479,480 | 12/1995 | Scott | 455/425 |
| 5,533,108 | 7/1996 | Harris et al. | 379/93.08 |
| 5,559,860 | 9/1996 | Mizikovsky | 455/415 |
| 5,590,406 | 12/1996 | Bayley et al. | 455/557 |
| 5,598,412 | 1/1997 | Griffith et al. | 455/560 |
| 5,625,677 | 4/1997 | Feiertag et al. | 379/93.28 |
| 5,631,950 | 5/1997 | Brown | 379/67 |
| 5,655,011 | 8/1997 | Bown | 379/93.06 |

FOREIGN PATENT DOCUMENTS

| | | |
|---|---|---|
| 60-128763 | 7/1985 | Japan . |
| 63-182924 | 7/1988 | Japan . |
| 2-194740 | 8/1990 | Japan . |

*Primary Examiner*—Dwayne D. Post
*Assistant Examiner*—Tracy M. Legree
*Attorney, Agent, or Firm*—John T. Johnson

[57] ABSTRACT

This invention provides a mobile communication system in which a call-incoming side can switch a communication line to an appropriate one which corresponds to a communication type requested by a transmitter's terminal. One example of its construction is as follows.

A mobile station has a plurality of terminal units corresponding to plural types of communication and a call number is preliminarily assigned to each of them. A terminal unit in a telephone network uses a call number corresponding to a desired communication type when a datum is transmitted to the mobile station. The mobile station informs this call number to all of the terminal units which are connected to the mobile station. The respective terminal units inform the communication type to the mobile station only when the communication type corresponding to the call number can be handled. The mobile station informs this communication type contained in a reception call receiving signal to a mobile communication exchange. The mobile communication exchange selects a modulated/demodulator corresponding to this communication type.

11 Claims, 4 Drawing Sheets

MOBILE COMMUNICATION SYSTEM, AUTOMATIC CALL RECEIVING METHOD, AND MOBILE STATION

BACKGROUND OF THE INVENTION

1. Field of the Invention

This invention relates to a mobile communication system, and more particularly to an automatic call receiving method applicable to a mobile communication system which is suited to be used for controlling a call-incoming when plural types or modes of communication, such as voice communication, modem communication, facsimile communication and the like, are performed using a digital automobile telephone, a digital portable telephone and the like.

2. Background of the Invention

In a digital mobile communication, there is a possibility that a signal, which is supplied from a wire communication section, cannot be directly modulated so as to be supplied to a radio communication section (i.e., wireless communication section) or vice versa (i.e., a signal, which is supplied from a radio communication section, cannot be demodulated so as to be directly supplied to a wire communication section), due to a relation between a communication speed in the wire communication section and a communication speed in the radio communication section. In order to cope with such situations, Japanese Patent Application No. Hei 1-39246 proposes a mobile communication system in which modulators/demodulators having the same standards as those used for respective terminal units of a telephone network are installed in mobile communication exchanges so that when a certain mobile station performs a communication with a terminal unit, the mobile communication exchange selects a modulator/demodulator having the same standard as that of a terminal unit on the side of the telephone network.

FIG. 3 and FIG. 4 are block diagrams showing a construction the mobile communication system proposed by the above Japanese Patent Application No. Hei 1-39246. In FIG. 3, reference numeral 100 denotes a mobile station. The mobile station 100 includes a change-over switch control unit 103, a voice signal converter 104, a data signal converter 105, a control unit 106, a communication radio transmitting/receiving circuit 107, a control radio transmitting/receiving circuit 108, and a switch circuit 109. A telephone set 101 and data terminals 102, acting as terminal units, are connected to the mobile station 100. In this example, the mobile station 100 and the data terminals 102 are connected through a V.24 interface.

In FIG. 4, reference numeral 200 denotes a radio base station. The radio base station 200 includes a communication radio transmitting/receiving circuit 201, a control radio transmitting/receiving circuit 202, a signal converter 203, and a base station control unit 204. Reference numeral 205 denotes a control line.

Likewise, reference numeral 300 denotes a mobile communication exchange. The mobile communication exchange 300 includes a switch circuit 301a, another switch circuit 301b, signal converters A to C (reference numerals 302 to 304), a voice signal converter 305, a modulator/demodulator B and C (reference numerals 306 and 307), PCM decoders 308, and a control unit 309. Here, the signal converters B and C are connected respectively to the modulator/demodulator B and C through V.24 interfaces.

Reference numeral 400 denotes a telephone network (network). Exchanges and communication devices are connected to the telephone network 400 according to circumstances. Here, reference numeral 500 denotes a telephone with modem function as one kind of a communication device. The telephone with modem function 500 includes a telephone set 501, a data terminal 502, a modulator/demodulator 503, and a network control unit 504.

In the above-mentioned construction, a voice communication can be performed between the telephone set 101 in the mobile station and the telephone set 501 in the telephone with modem function 500 on the side of the telephone network 400. Also, a data communication can be performed between the data terminals 102 in the mobile station 100 and the data terminal 502 in the telephone with modem function 500. The voice communication and the data communication are performed via the mobile station 100, the radio base station 200, the mobile communication exchange 300, and the telephone network 400. Types of communication are switched from one to another in accordance with necessity during communication procedures, such as from a data communication to a voice communication. Operation of the mobile communication system will be described hereinafter.

(1) In Case Data are transmitted from Data Terminal 101 in Mobile Station 100 to Data Terminal 502 in telephone with modem function 500

In this case, in the mobile station 100, data indicative of the same communication type as that of the modulator/demodulator 503 which is used by the data terminal 502 on the other end of communication is given to the control unit 106 from the change-over switch control unit 103. A data terminal 101, among others, which has data to be transmitted, is selected by the change-over switch circuit 109. After the completion of the above-mentioned procedures, a call is issued from the mobile station 100.

A call control between the mobile station 100 and the mobile communication exchange 300 is performed in the same manner as a connection control, for example, of an automobile telephone switching system. In this mobile communication system, a call signal containing data indicative of communication type of the modulator/demodulator (modulator/demodulator 503 in this example) of the terminal of the other end is transmitted to the radio base station 200 from the control radio transmitting/receiving circuit 108 of the mobile station 100.

The call signal containing data indicative of the communication type is received by the control unit 309 of the mobile communication exchange 300 via the control radio transmitting/receiving circuit 202, the base station control circuit 204 and the control line 205 of the radio base station 200. As a consequence, the communication line is switched from one to another under the control of the control unit 309 so that a communication is performed via the signal converter and the modulator/demodulator corresponding to the communication type of the modulator/demodulator of the terminal of the other end.

For example, in case the communication type of the modulator/demodulator B (reference numeral 806) is the same as the modulator/demodulator of the terminal of the other end, the communication line from the radio base station 200 is connected to the signal converter B (reference numeral 303) of a front stage of the modulator/demodulator B (reference numeral 306) by the switch circuit 301a. Also, an outgoing line of the PCM decoder 308 of a rear stage of the modulator/demodulator B (reference numeral 306) is connected to an outgoing line to the telephone network 400 by the switch circuit 301b.

Data indicative of the communication type of the modulator/demodulator are transmitted, where necessary, to the radio base station 200 from the control circuit 309 via the control line 205. The data indicative of the communication type of the modulator/demodulator may be detected by the radio base station during the switching procedure instead of being notified from the mobile communication exchange to the radio base station.

As a result of the above-mentioned procedures, the modulator/demodulator B (reference numeral 306) of the same communication type as the modulator/demodulator 503 which is used by the data terminal 502 is inserted in a communication channel connecting the data terminal 102 of the mobile station 100 and the data terminal 502 on the side of the telephone network 100, thus enabling an end-to-end communication between the data terminals 102 and 502.

(2) In Case Mobile Station 100 designates Communication Mode by Telephone Set 101 at the time a Calling is made and then makes a switching of the Communication Mode to Data Communication Mode In the mobile communication exchange 309, the communication line from the radio base station 200 is connected to the signal converter A (reference numeral 302) of the front stage of the voice signal converter 305 by the switch circuit 301a and the outgoing line of the PCM decoder 308 of the rear stage of the voice signal converter A (reference numeral 305) is connected to the outgoing line to the telephone network 400 by the switch circuit 301b, during the time a voice communication is undergoing.

For switching the communication mode from the voice communication to the data communication, the communication circuit is switched so that the signal converter and the modulator/demodulator of the same communication type as the modulator/demodulator of the terminal of the other end of the data communication are contained in the communication circuit. Presuming that the modulator/demodulator B (reference numeral 306) is of the same communication type as the modulator/demodulator of the terminal of the other end of the data communication, for example, the signal converter B (reference numeral 303) of the front stage of the modulator/demodulator B (reference numeral 306) is selected by the switch circuit 301a and the outgoing line of the PCM decoder 308 of the rear stage of the modulator/demodulator B (reference numeral 306) is selected by the switch circuit 301b.

(3) In Case Call-Incoming from telephone with modem function500 is received by Mobile Station 100

In case the mobile station 100 is a caller, a communication is started when the mobile station 100 transmits the communication type data to the mobile communication exchange 300 as in the case where the mobile station 100 is a receiver. This will be described in more detail.

a. In Case of Manual Reception of Call-Incoming

When a call-incoming is received by the mobile station 100, the user of the mobile station 100 judges the communication type based on an audible sound, etc., coming from the terminal of the other end, using the telephone set 101 and manually switches the communication type to the intended one. As a consequence, data indicative of the communication type are transmitted to the mobile communication exchange 300. In the mobile communication exchange 300, the communication circuit is switched under the control of the control unit 309 so that a communication is performed via the signal converter and the modulator/demodulator corresponding to the type of communication coming from the mobile station 100.

b. In Case of Automatic Reception of Call-Incoming

The type of the telephone set or the modulator/demodulator of the terminal of the other end preset by the change-over switch unit 103 is used for controlling the reception of a call-incoming. For example, in case data indicative of the type of the modulator/demodulator 503 of the data terminal 502 is preset, this data is transmitted to the mobile communication exchange 300. As a consequence, the communication circuit is switched under the control of the control unit 309 so that a communication is performed via the signal converter and the modulator/demodulator corresponding to the type of the modulator/demodulator of the terminal of the other end.

SUMMARY OF THE INVENTION

As described in the foregoing, the conventional mobile communication systems have such a problem that when a call coming from a terminal on the side of a telephone network is received by a mobile station, there is no other way on the mobile station side but to select one of the two choices; the first choice is that the communication channel is manually switch to an appropriate one by the user of the mobile station, judging the type of the communication and utilizing a manual call-incoming device of the mobile station, and the second choice is that a certain communication type is preliminarily set and only a call corresponding to this communication type is automatically received. The reason is that the communication type cannot be guessed on the mobile station side. As a consequence, an automatic call reception function of the mobile station cannot be effectively utilized.

The present invention has been accomplished on the above-mentioned background. It is, therefore, an object of the present invention to provide a mobile communication system, an automatic call receiving method, and a mobile station in which the communication channel can be smoothly switched to the channel corresponding to a communication type requested by the terminal on the other end.

In order to achieve the above object, according to the invention as defined in claim 1, there is provided a communication system comprising an exchange connected to a network and including a plurality of modulators/demodulators capable of coping with plural types of communication and a communication device connected to the exchange, wherein the communication device is capable of responding to all call numbers corresponding to a plurality of terminal units connected to the communication device;

the communication device comprising:

number notification means for notifying, when a call is issued to the communication device via the exchange, the number of the call to a plurality of terminal units connected to the communication device; and communication type notification means for selecting a specific terminal unit, when a signal indicative of "communicable" is supplied by one of the terminal units which has received a notice from the number notification means, and notifying the type of communication to the exchange;

the exchange comprising selection means capable of selecting one of the modulators/demodulators corresponding to the notice provided by the communication type notification means.

According to the invention as defined in claim 2, there is also provided a communication system comprising an exchange connected to a network and including a plurality of modulators/demodulators corresponding to plural types of communication and a communication device connected to the exchange, wherein the communication device is capable of responding to all call numbers corresponding to a plurality of terminal units connected to the communication device;

the communication device comprising:

number notification means for notifying, when a call is issued to the communication device via the exchange, the number of the call to a plurality of terminal units connected to the communication device; and control means for selecting a specific terminal unit, when a signal indicative of "communicable" is supplied by one of the terminal units which has received a notice from the number notification means;

the exchange comprising:

communication type storage means for pre-storing relation data between the call numbers of the terminal units connected to the communication device and the communication type; and selection means capable of selecting one of the modulators/demodulators corresponding to the call number with reference to data stored in the communication type storage means when a read-out is performed with respect to the communication device.

According to the invention as defined in claim 3, there is also provided a communication system according to claim 1 or 2, wherein the signal indicative of "communicable" is a signal indicative of the type of communication of the terminal unit.

According to the invention as defined in claim 4, there is also provided a communication system comprising a mobile communication exchange connected to a network and including a plurality of modulators/demodulators corresponding to plural types of communication, a radio base station connected to the mobile communication exchange, and a mobile station connected to the radio base station through a radio circuit, wherein the mobile station is capable of responding to all call numbers corresponding to a plurality of terminal units connected to the mobile station, the mobile station comprising:

number notification means for notifying, when a call is issued to the mobile station via the mobile communication exchange and the radio base station, the number of the call to the plurality of terminal units connected to the mobile station; and communication type notification means for selecting a specific terminal unit, when a signal indicative of "communicable" is supplied by one of the terminal units which has received a notice from the number notification means, and notifying the type of communication to the mobile communication exchange;

the mobile communication exchange comprising selection means capable of selecting one of the modulators/demodulators corresponding to the communication type notice provided by the communication type notification means.

According to the invention as defined in claim 5, there is also provided a communication system comprising a mobile communication exchange connected to a network and including a plurality of modulators/demodulators corresponding to plural types of communication, a radio base station connected to the mobile communication exchange, and a mobile station connected to the radio base station through a radio circuit, wherein the mobile station is capable of responding to all call numbers corresponding to a plurality of terminal units connected to the mobile station, the mobile station comprising:

number notification means for notifying, when a call is issued to the mobile station via the mobile communication exchange and the radio base station, the number of the call to the plurality of terminal units connected to the mobile station; and control means for selecting a specific terminal unit, when a signal indicative of "communicable" is supplied by one of the terminal units which has received a notice from the number notification means;

the mobile communication exchange comprising:

communication type storage means for pre-storing relation data between the call numbers of the terminal units connected to the mobile station and the communication type; and selection means capable of selecting one of the modulators/demodulators corresponding to the call number with reference to data stored in the communication type storage means when a read-out is performed with respect to the mobile station.

According to the invention as defined in claim 6, there is also provided a communication system according to claim 4 or 5, wherein the signal indicative of "communicable" is a signal indicative of the type of communication of the terminal unit.

According to the invention as defined in claim 7, there is also provided a communication system comprising a mobile communication exchange connected to a network and including a plurality of modulators/demodulators corresponding to plural types of communication, a radio base station connected to the mobile communication exchange, a mobile station connected to the radio base station through a radio circuit, and a private branch exchange connected to the mobile station, wherein the mobile station is capable of responding to all call numbers corresponding to a plurality of terminal units connected to the private branch exchange, the mobile station comprising:

communication type detecting means for detecting, when a call is issued to the mobile station via the mobile communication exchange and the radio base station, a communication type corresponding to the call number and supplying a signal pattern designating a terminal unit corresponding to the communication type to the private branch exchange;

the private branch exchange comprising:

call-incoming detecting means for supplying, upon receipt of the pattern signal, a ringer signal to a terminal unit corresponding to the pattern signal and transmitting a call-incoming response signal to the mobile station when a call-incoming of the terminal unit is detected;

the mobile station comprising:

communication type notification means for notifying, upon receipt of the call-incoming response signal, to the mobile communication exchange;

the mobile communication exchange comprising:

selection means capable of selecting one of the modulators/demodulators corresponding to the notice provided by the communication type notification means.

According to the invention as defined in claim 8, there is also provided a communication system comprising a mobile communication exchange connected to a network and including a plurality of modulators/demodulators corresponding to plural types of communication, a radio base station connected to the mobile communication exchange, a mobile station connected to the radio base station through a radio circuit, and a private branch exchange connected to the mobile station, wherein the mobile station is capable of responding to all call numbers corresponding to a plurality of terminal units connected to the private branch exchange, the mobile station comprising:

communication type detecting means for detecting, when a call is issued to the mobile station via the mobile communication exchange and the radio base station, a communication type corresponding to the call number and supplying a signal pattern designating a terminal unit corresponding to the communication type to the private branch exchange;

the private branch exchange comprising:

call-incoming detecting means for supplying, upon receipt of the pattern signal, a ringer signal to a terminal unit corresponding to the pattern signal and transmitting a call-incoming response signal to the mobile station when a call-incoming of the terminal unit is detected;

the mobile communication exchange comprising:

communication type notification means for pre-storing relation data between the call numbers of the terminal units connected to the private branch exchange and the communication type; and selection means capable of selecting one of the modulators/demodulators corresponding to the call number with reference to data stored in the communication type storage means when a read-out is performed with respect to the mobile station.

According to the invention as defined in claim 9, there is also provided an automatic call receiving method applicable to a communication system comprising a mobile communication exchange connected to a network and including a plurality of modulators/demodulators corresponding to plural types of communication, a radio base station connected to the mobile communication exchange, and a mobile station connected to the radio base station through a radio circuit, wherein the mobile station is capable of responding to all call numbers corresponding to a plurality of terminal units connected to the mobile station, the mobile station notifying, when a call is issued to the mobile station via the mobile communication exchange and the radio base station, the number of the call to a plurality of terminal units connected to the mobile station;

each terminal unit, which has received the call number, notifying a signal indicative of "communicable" to the mobile station only when the communication type corresponding to the call number is a communication type which can be handled by the terminal unit;

the mobile station selecting a specific terminal unit, when a signal indicative of "communicable" is supplied to the mobile station, and notifying the communication type to the mobile communication exchange;

the mobile communication exchange selecting one of the modulators/demodulators corresponding to the communication type supplied by the mobile station.

According to the invention as defined in claim 10, there is also provided an automatic call receiving method applicable to a communication system comprising a mobile communication exchange connected to a network and including a plurality of modulators/demodulators corresponding to plural types of communication, a radio base station connected to the mobile communication exchange, a mobile station connected to the radio base station through a radio circuit, and a private branch exchange connected to the mobile station, wherein the mobile station is capable of responding to all call numbers corresponding to a plurality of terminal units connected to the private branch exchange, the mobile station finding, when a call is issued to the mobile station via the mobile communication exchange and the radio base station, a communication type corresponding to the call number and supplying a signal pattern designating a terminal unit corresponding to the communication type to the private branch exchange;

the private branch exchange supplying, upon receipt of the pattern signal, a ringer signal to a terminal unit corresponding to the pattern signal and transmitting a call-incoming response signal to the mobile station when a call-incoming of the terminal unit is detected;

the mobile station notifying a communication type corresponding to the terminal unit to the mobile communication exchange upon receipt of the call-incoming response signal;

the mobile communication exchange selecting one of the modulators/demodulators corresponding to the notice supplied by the communication type notification means.

According to the invention as defined in claim 11, there is also provided a mobile station usable in a mobile communication system comprising an exchange connected to a network and including a plurality of modulators/demodulators corresponding to plural types of communication and a radio base station connected to the mobile communication exchange, wherein the mobile station is capable of responding to all call numbers corresponding to a plurality of terminal units connected to the mobile station;

the mobile station comprising:

number notification means for notifying, when a call is issued to the mobile station via the mobile communication exchange and the radio base station, the number of the call to a plurality of terminal units connected to the mobile station; and notification means for notifying, when a signal indicative of the communication type is supplied by one of the terminal units which has received a notice from the number notification means, the communication type to the mobile communication exchange.

According to the invention as defined in claims 1, 4 and 9, in a communication device or a mobile station as a call-incoming receiver, a call-incoming is automatically received by a terminal unit which undertakes a communication of the type corresponding to a call number and the communication type is transmitted to the exchange or mobile communication exchange. Then, the exchange or mobile communication exchange selects a modulator/demodulator corresponding to the communication type thus received.

According to the invention as defined in claims 2, 5 and 10, the exchange or mobile communication exchange automatically selects a modulator/demodulator corresponding to the communication type with reference to the call number to the communication device or the mobile station.

According to the invention as defined in claims 7 and 8, on the mobile station side, a call-incoming is automatically received by a terminal unit which undertakes a communication of the type corresponding to the call number, under the effect of control via a private branch exchange.

According to the invention as defined in claim 11, since a signal indicative of the type of communication is output from a mobile station, selection of a modulator/demodulator, etc. can be automatically performed in the mobile communication exchange, utilizing the signal thus output from the mobile station.

DETAILED DESCRIPTION OF THE PREFERRED EMBODIMENTS

1. First Embodiment

Figure 1:
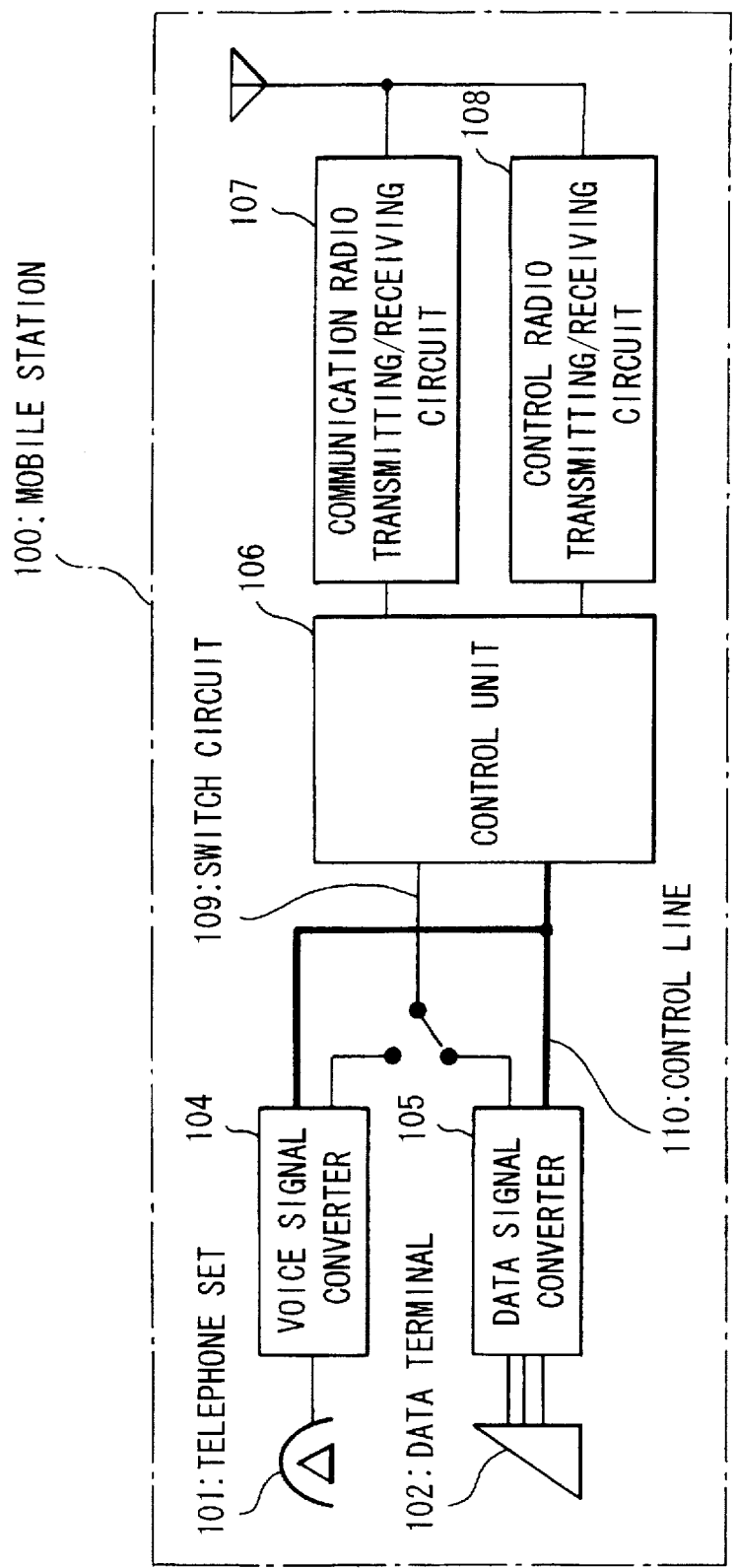
FIG. 1 is a block diagram showing a construction of a first embodiment of the present invention.
Figure 3:
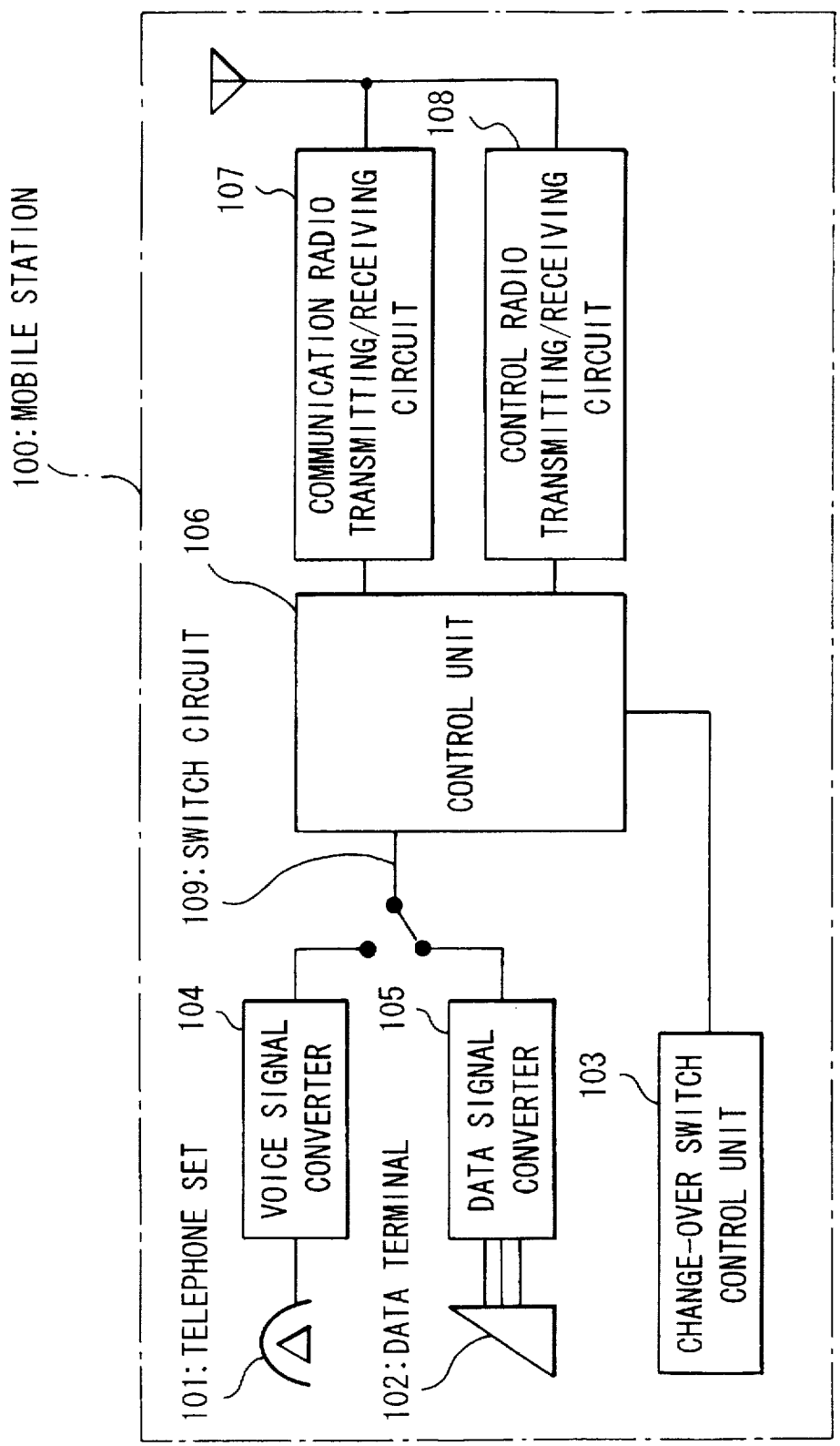
FIG. 3 is a block diagram showing one example of a construction of a mobile station in a mobile communication system.

FIG. 1 shows a construction of a mobile station 100 according to this embodiment. Since the mobile station 100 has common parts with the one shown in FIG. 3, those common parts are denoted by the same reference numerals as used in FIG. 3.

A. Construction of First Embodiment

Main features of the mobile station 100 according to this embodiment are as follows.

① The mobile station 100 is assigned with a plurality of call numbers. The mobile station 100 is constructed such that it can respond to a call designating any one of the call numbers. The call numbers assigned to the mobile station 100 correspond respectively to the types of communication which the mobile station 100 can perform. In the example of FIG. 1, since a telephone set 101 and a data terminal 102 are connected to the mobile station 100, unique call numbers corresponding to the types of communication performed by the telephone set 101 and the data terminal 102 are assigned.

② A control unit 106 is connected to a voice signal converter 104 and a data signal converter 105 through a control line 110. When the mobile station 100 has received a call, the control unit 106 outputs the call number to the control line 110. This call number is supplied to the telephone set 101 and the data terminal 102 respectively through the voice signal converter 104 and the data signal converter 105. Any response from the telephone set 101 or the data terminal 102 with respect to the call number is sent to the control unit 106 through the control line 110.

③ The respective terminal units connected to the mobile station 100, namely, telephone set 101 and data terminal 102 in the example of FIG. 1, have the following functions.

a. A function for making a judgment, based on the call number, as to whether or not the specific terminal unit can perform a communication responsive to the call. This judgment is made by judging, for example, whether or not the call number is a number set to the specific terminal unit.

b. A function for transmitting data indicative of the type of communication in case a communication responsive to the call is possible. The data indicative of the type of communication have a function indicating that a communication is possible by the specific terminal unit.

Those functions may be provided within the respective terminal units or they may be provided to external devices such as adapters or the like. In case the above functions are provided to the adapters or the like, the terminal units may be of the general-purposes type which do not have the above functions. The above functions will be described in detail along with the description of operation of this embodiment in order to avoid duplicate description.

B. Operation of First Embodiment

Figure 4:
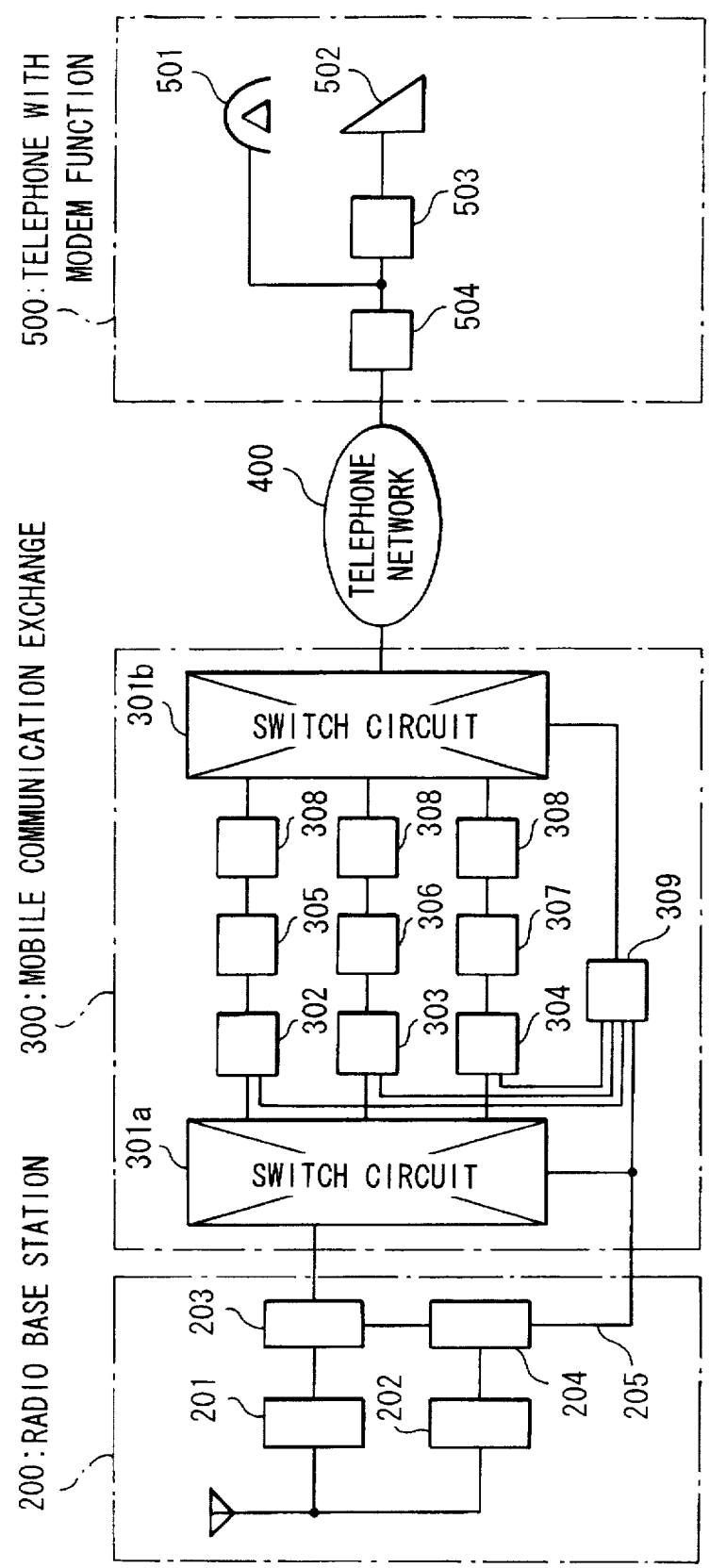
FIG. 4 is a block diagram exemplifying a radio base station, a mobile communication exchange, a telephone network and a compound terminal in a mobile communication system.

Operation of this embodiment will be described with reference to a case where a telephone with modem function 500 of FIG. 4 issues an originating call to the mobile station 100 of this embodiment and the mobile station 100 responds thereto by way of an automatic receipt of a call-incoming.

First, the user of the compound terminal 500 makes an originating call using a call number corresponding to the type of communication to be performed between the mobile station 100 and the compound terminal 500. In the example of FIG. 1, the mobile station 100 has the telephone set 101 to be used for a voice communication and the data terminal 102 to be used for a data communication. Presume that "0001" and "0002" are assigned respectively to the telephone set 101 and the data terminal 102 as a call number. In this case, the user of the compound terminal 500 makes a call using "0001" as a call number when the desired communication type is a voice communication and "0002" when the desired communication type is a data communication.

When the mobile station 100 has received a call designating the above call number, this call number is output from the control unit 106 to the control line 110 and supplied to the telephone set 101 and the data terminal 102 respectively through the voice signal converter 104 and the data signal converter 105.

In the telephone set 101 and in the data terminal 102, procedures corresponding to the functions a and b are performed. Presuming that the call number is, for example, "0002", the procedures in the telephone set 101 and the data terminal 102 are as follows.

First, since the telephone set 101 is a terminal unit corresponding to a voice communication, it cannot perform a data communication corresponding to the call number "0002". Therefore, the telephone set 101 selects an "irresponsible". As a consequence, the telephone set 101 does not output a signal indicative of the type of communication.

On the other hand, since the data terminal 102 is a terminal unit corresponding to a data communication, it can perform a data communication corresponding to the call number "0002". As a consequence, the data terminal 102 selects a "responsible" and sends data indicative of the type of communication (data communication in this case) to the control unit 106 through the data signal converter 105 and the control line 110.

In case there are plural types of data communication which the mobile station 100 can cope with, a plurality of data communication call numbers such as, for example, "0002" and "0003" are assigned to the mobile station 100 so that the numbers correspond to various data communications, respectively. In this case, the data terminal 102 selects the "responsible" when it has received the call number "0002" or "0003" and provides data indicative of the type of communication corresponding to the received call number to the data signal converter 105. Upon receipt of the notice, the data signal converter 105 switches the operation mode from one to another in order to perform a conversion of a data signal corresponding to the specific communication type.

When the control unit 106 receives the data indicative of the type of communication through the control line 110, it sends the data to a mobile communication exchange 300

(FIG. 4). The subsequent operations are the same as those described in the prior art column.

2. Second Embodiment

A. Construction of Second Embodiment

Figure 2:
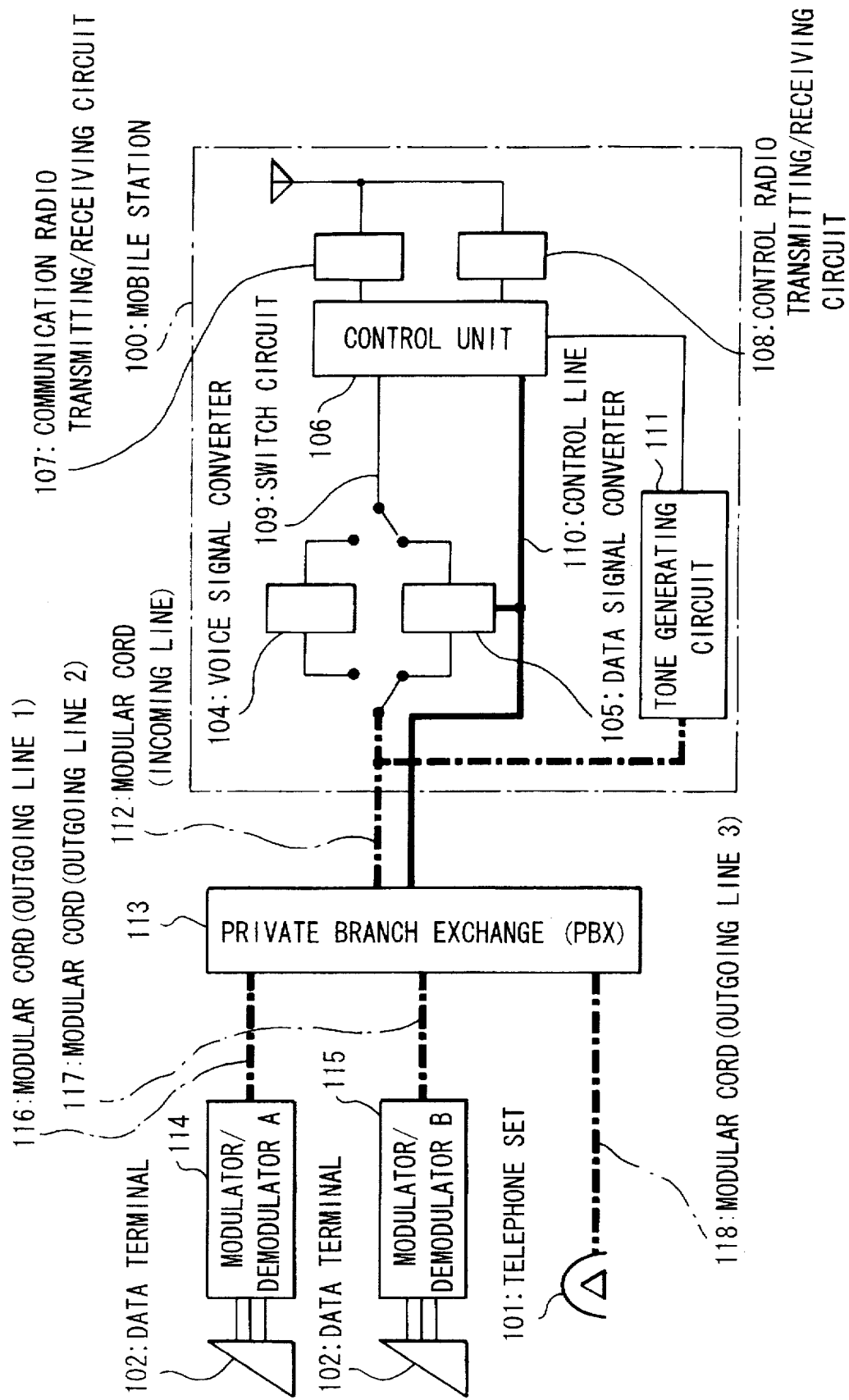
FIG. 2 is a block diagram showing a construction of a first embodiment of the present invention.

FIG. 2 is a block diagram showing a construction according to the second embodiment. In FIG. 2, those parts corresponding to the respective parts of FIG. 1 are denoted by identical reference numerals. In FIG. 2, reference numerals 112 and 116 to 118 denote modular cords; 113, a private branch exchange; 114, a modulator/demodulator A; and 115, a modulator/demodulator B, respectively. This embodiment discloses a construction in which the present invention is applied to a mobile station of a ship communication or the like and in which data terminals, etc. on the side of the mobile station are connected to the mobile station 100 by an analog interface via the private branch exchange 113. As in the case with the first embodiment, the mobile station 100 is assigned with a plurality of call numbers, so that it can respond to a call designating any one of the call numbers.

A tone generating circuit 111 is connected to the control unit 106. Under the control of the control unit 106, the tone generating circuit 111 outputs an in-band signal for controlling the switching operation of the private branch exchange 113. This private branch exchange 113 receives the in-band signal through the modular cord 112 on the incoming line side, selects a modular cord 116, 117 or 118 on the outgoing line side in accordance with a signal pattern of the in-band signal, outputs a ringer signal to the cable, and calls a terminal unit connected to the cable. The control unit 106 in this embodiment judges the type of communication requested by the other party and determines the pattern of the in-band signal so that the modular cord connected to the terminal unit corresponding to the communication type is selected by the private branch exchange 113.

B. Operation of Second Embodiment

In such a construction as mentioned above, operation will be described with reference to a case where a telephone with modem function 500 of FIG. 4 issues an originating call to the mobile station 100 and the mobile station 100 responds thereto by way of an automatic receipt of a call-incoming.

First, the user of the compound terminal 500 makes an originating call using a call number corresponding to the type of communication to be performed between the mobile station 100 and the compound terminal 500 as in the case with the first embodiment. When the mobile station 100 has received a call designating the above call number, it finds the type of communication requested by the other party based on the call number and generates an in-band signal having a pattern corresponding to the communication type through the tone generating circuit 111. This in-band signal is sent to the private branch exchange 113 through the modular cord 112.

Then, a modular cord (for example, modular cord117) on the side of the outgoing line, which cable corresponds to the pattern of the in-band signal, is selected by the private branch exchange 113, and a ringer signal is sent to the cable. As a consequence, the modulator/demodulator B (reference numeral 115) connected to the modular cord 117 is off-hooked in response to the ringer signal. This off-hooked state is detected by the private branch exchange 113 and further notified to the control unit 106 from the private branch exchange 113 through the control line 110.

Upon receipt of this notice, the control unit 106 switches the change-over switch 109 to the data signal converter 105 and also switches the operation mode of the data signal converter 105 to the type of communication corresponding to the call number, namely, the mode corresponding to the type of communication requested by the other party, through the control line 110. The modulator/demodulator B (reference numeral 115) carries out a modem-negotiation with the data signal converter 105, and the terminal 102 is logically connected to the data signal converter 105.

When the preparation of communication has been completed in this way, the control unit 106 sends data indicative of the type of communication to the mobile communication exchange 300 (FIG. 4) through the control line 110. The subsequent operation is the same as the first embodiment.

As described in the foregoing, according to the present invention, when a call-incoming from a terminal unit in the telephone network is received by the mobile station, the mode of communication is automatically switched to the type of communication requested by the terminal of the other end by means of control made by the mobile station side as a call-incoming receiver. Accordingly, there is such an effect that the mobile station can cope with various types of communication such as data communication, facsimile communication and the like, through its function of automatic receipt of a call-incoming.

3. Modified Examples

The above-mentioned embodiments can be modified as follows.

①  The telephone set 101 to be connected to the mobile station 100 in the manner as shown in FIG. 1 may be integrally formed with the mobile station 100.

②  In the above-mentioned embodiments, the mobile station 100 and the fixed side communication device (telephone with modem function 500) are employed. The present invention is likewise applicable to any communication between mobile stations and between fixed side communication devices. In the case of a communication between the fixed side communication devices, a fixed exchange is employed. Accordingly, in the fixed exchange, a provision of a similar construction to that of the mobile communication exchange 300 of FIG. 4 is required. Specifically, a provision of a plurality of signal channels (signal converter, modulator/demodulator, etc.) corresponding to various types of communication and a provision of change-over switch circuits for switching such channels are required.

③  In the above-mentioned embodiments, a signal indicative of the type of communication is output from the mobile station and the mobile communication exchange, which has received the signal, switches the signal channel (signal converter, modulator/demodulator, etc.) from one to another. In the alternative, there is an arrangement in which the mobile communication exchange itself detects the type of communication and switches the signal channel based on the detected result. In this case, the detection of the type of communication is made as follows. For example, a storage device (semiconductor memory, hard disk or the like) for storing a corresponding relation between the call number and the type of communication) is provided within the control unit 309, so that when a call number is supplied from one of the communication devices (fixed side unit and mobile station), the type of communication can be detected with reference to the content stored in the storage unit. Such a control can likewise be performed in the fixed exchange.

In the event that a mobile station, which has received a call, is situated outside the communication area or in a power-off state, it is a general practice that the mobile communication exchange notifies the fact to the terminal of the other end by voice. In the alternative, the following control can be made. Presume that the mobile communication exchange is designed such that it judges the type of communication in the manner as mentioned above. In case the other party wants a communication using a facsimile machine, the mobile communication exchange can know this. Therefore, instead of the notice by voice (or in addition to the notice by voice), the mobile communication exchange accumulates facsimile communication data received from the other party and transmits the accumulated data to the other party at the time point when the mobile station is brought into a communicable area.

(4) In the above-mentioned first embodiment, the terminal unit (or adapter) connected to the mobile station has a function for transmitting data indicative of the type of communication when a communication corresponding to the call is possible. In the alternative, data indicative of the face that the specific terminal unit is communicable may be transmitted. In that case, the mobile station, which has received the signal, recognizes the type of communication by judging as to from what terminal unit the signal has come, and notifies the type of communication corresponding to the recognized result to the mobile communication exchange. Such a control may of course be performed between a fixed exchange and a communication device connected to the fixed exchange.

What is claimed is:

1. A communication system comprising an exchange connected to a network and including a plurality of modulators/demodulators corresponding to plural types of communication and a communication device being capable of communicating with said exchange over the air, wherein said communication device is capable of responding to all call numbers corresponding to a plurality of terminal units connected to said communication device;

said communication device comprising:

number notification means for notifying, when a call is issued to said communication device via said exchange, the number of said call to a plurality of terminal units connected to said communication device; and communication type notification means for selecting a specific terminal unit, when a signal indicative of "communicable" is supplied by one of said terminal units which has received a notice from said number notification means, and notifying the type of communication to said exchange;

said exchange comprising selection means capable of selecting one of said modulators/demodulators corresponding to said notice provided by said communication type notification means.

2. A communication system according to claim 1, wherein said signal indicative of "communicable" is a signal indicative of the type of communication of said terminal unit.

3. A communication system comprising an exchange connected to a network and including a plurality of modulators/demodulators corresponding to plural types of communication and a communication device being capable of communicating with said exchange, wherein said communication device is capable of responding to all call numbers corresponding to a plurality of terminal units connected to said communication device;

said communication device comprising:

number notification means for notifying, when a call is issued to said communication device via said exchange, the number of said call to a plurality of terminal units connected to said communication device; and control means for selecting a specific terminal unit, when a signal indicative of "communicable" is supplied by one of said terminal units which has received a notice from said number notification means;

said exchange comprising:

communication type storage means for pre-storing relation data between the call numbers of said terminal units connected to said communication device and said communication type; and selection means capable of selecting one of said modulators/demodulators corresponding to said call number with reference to data stored in said communication type storage means when a read-out is performed with respect to said communication device.

4. A communication system comprising a mobile communication exchange connected to a network and including a plurality of modulators/demodulators corresponding to plural types of communication, a radio base station connected to said mobile communication exchange, and a mobile station being capable of communicating with said radio base station over the air, wherein said mobile station is capable of responding to all call numbers corresponding to a plurality of terminal units connected to said mobile station, said mobile station comprising:

number notification means for notifying, when a call is issued to said mobile station via said mobile communication exchange and said radio base station, the number of said call to the plurality of terminal units connected to said mobile station; and communication type notification means for selecting a specific terminal unit, when a signal indicative of "communicable" is supplied by one of said terminal units which has received a notice from said number notification means, and notifying the type of communication to said mobile communication exchange;

said mobile communication exchange comprising selection means capable of selecting one of said modulators/demodulators corresponding to said communication type notice provided by said communication type notification means.

5. A communication system according to claim 4, wherein said signal indicative of "communicable" is a signal indicative of the type of communication of said terminal unit.

6. A communication system comprising a mobile communication exchange connected to a network and including a plurality of modulators/demodulators corresponding to plural types of communication, a radio base station connected to said mobile communication exchange, and a mobile station being capable of communicating said radio base station over the air, wherein said mobile station is capable of responding to all call numbers corresponding to a plurality of terminal units connected to said mobile station, said mobile station comprising:

number notification means for notifying, when a call is issued to said mobile station via said mobile communication exchange and said radio base station, the number of said call to the plurality of terminal units connected to said mobile station; and control means for selecting a specific terminal unit, when a signal indicative of "communicable" is supplied by one of said terminal units which has received a notice from said number notification means;

said mobile communication exchange comprising:

communication type storage means for pre-storing relation data between the call numbers of said terminal units connected to said mobile station and said communication type; and selection means capable of selecting one of said modulators/demodulators corresponding to said call number with reference to data stored in said communication type storage means when a read-out is performed with respect to said mobile station.

7. A communication system comprising a mobile communication exchange connected to a network and including a plurality of modulators/demodulators corresponding to plural types of communication, a radio base station connected to said mobile communication exchange, a mobile station being capable of communicating with said radio base station over the air, and a private branch exchange connected to said mobile station, wherein said mobile station is capable of responding to all call numbers corresponding to a plurality of terminal units connected to said private branch exchange, said mobile station comprising:

communication type detecting means for detecting, when a call is issued to said mobile station via said mobile communication exchange and said radio base station, a communication type corresponding to said call number and supplying a signal pattern designating a terminal unit corresponding to said communication type to said private branch exchange;

said private branch exchange comprising:

call-incoming detecting means for supplying, upon receipt of said pattern signal, a ringer signal to a terminal unit corresponding to said pattern signal and transmitting a call-incoming response signal to said mobile station when a call-incoming of said terminal unit is detected;

said mobile station comprising:

communication type notification means for notifying, upon receipt of said call-incoming response signal, to said mobile communication exchange;

said mobile communication exchange comprising:

selection means capable of selecting one of said modulators/demodulators corresponding to said notice provided by said communication type notification means.

8. A communication system comprising a mobile communication exchange connected to a network and including a plurality of modulators/demodulators corresponding to plural types of communication, a radio base station connected to said mobile communication exchange, a mobile station being capable of communicating with said radio base station over the air, and a private branch exchange connected to said mobile station, wherein said mobile station is capable of responding to all call numbers corresponding to a plurality of terminal units connected to said private branch exchange, said mobile station comprising:

communication type detecting means for detecting, when a call is issued to said mobile station via said mobile communication exchange and said radio base station, a communication type corresponding to said call number and supplying a signal pattern designating a terminal unit corresponding to said communication type to said private branch exchange;

said private branch exchange comprising:

call-incoming detecting means for supplying, upon receipt of said pattern signal, a ringer signal to a terminal unit corresponding to said pattern signal and transmitting a call-incoming response signal to said mobile station when a call-incoming of said terminal unit is detected;

said mobile communication exchange comprising:

communication type notification means for pre-storing relation data between the call numbers of said terminal units connected to said private branch exchange and said communication type; and selection means capable of selecting one of said modulators/demodulators corresponding to said call number with reference to data stored in said communication type storage means when a read-out is performed with respect to said mobile station.

9. An automatic call receiving method applicable to a communication system comprising a mobile communication exchange connected to a network and including a plurality of modulators/demodulators corresponding to plural types of communication, a radio base station connected to said mobile communication exchange, and a mobile station being capable of communicating with said radio base station over the air, wherein said mobile station is capable of responding to all call numbers corresponding to a plurality of terminal units connected to said mobile station, said mobile station notifying, when a call is issued to said mobile station via said mobile communication exchange and said radio base station, the number of said call to a plurality of terminal units connected to said mobile station;

each terminal unit, which has received the call number, notifying a signal indicative of "communicable" to said mobile station only when the communication type corresponding to said call number is a communication type which can be handled by said terminal unit;

said mobile station selecting a specific terminal unit, when a signal indicative of "communicable" is supplied to said mobile station, and notifying said communication type to said mobile communication exchange;

said mobile communication exchange selecting one of said modulators/demodulators corresponding to said communication type supplied by said mobile station.

10. An automatic call receiving method applicable to a communication system comprising a mobile communication exchange connected to a network and including a plurality of modulators/demodulators corresponding to plural types of communication, a radio base station connected to said mobile communication exchange, a mobile station being capable of communicating with said radio base station over the air, and a private branch exchange connected to said mobile station, wherein said mobile station is capable of responding to all call numbers corresponding to a plurality of terminal units connected to said private branch exchange, said mobile station finding, when a call is issued to said mobile station via said mobile communication exchange and said radio base station, a communication type corresponding to said call number and supplying a signal pattern designating a terminal unit corresponding to said communication type to said private branch exchange;

said private branch exchange supplying, upon receipt of said pattern signal, a ringer signal to a terminal unit corresponding to said pattern signal and transmitting a call-incoming response signal to said mobile station when a call-incoming of said terminal unit is detected;

said mobile station notifying a communication type corresponding to said terminal unit to said mobile communication exchange upon receipt of said call-incoming response signal;

said mobile communication exchange selecting one of said modulators/demodulators corresponding to the notice supplied by said communication type notification means.

11. A mobile station usable in a mobile communication system comprising a mobile communication exchange connected to a network and including a plurality of modulators/demodulators corresponding toplural types of communication and a radio base station connected to said mobile communication exchange, wherein said mobile station is capable of responding to all call numbers corresponding to a plurality of terminal units connected to said mobile station;

said mobile station comprising:

number notification means for notifying, when a call is issued to said mobile station via said mobile communication exchange and said radio base station, the number of said call to a plurality of terminal units connected to said mobile station; and notification means for notifying, when a signal indicative of the communication type is supplied by one of said terminal units which has received a notice from said number notification means, said communication type to said mobile communication exchange.

* * * * *